UNITED STATES PATENT OFFICE.

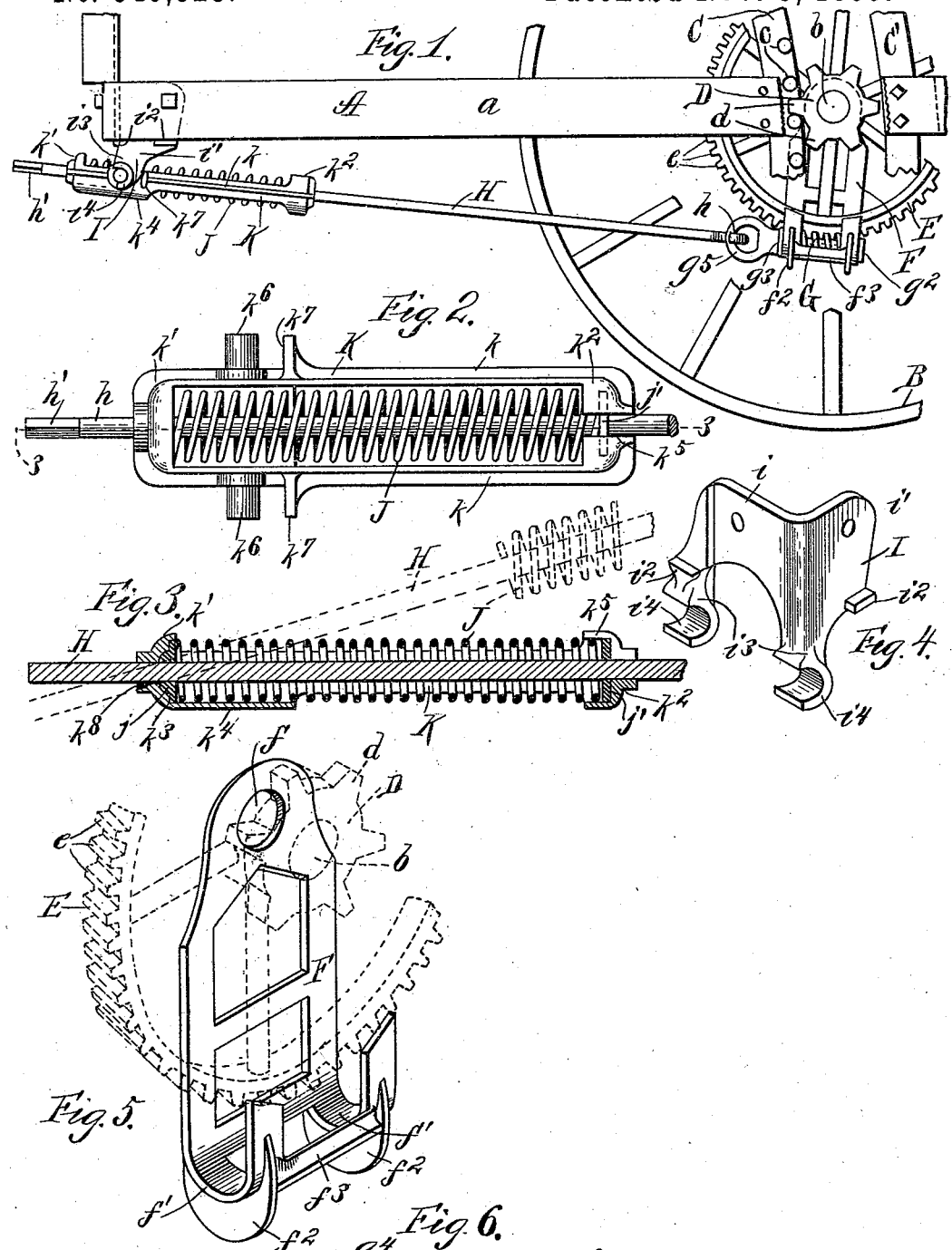

JAMES MACPHAIL, OF BLUE ISLAND, ASSIGNOR TO THE PLANO MANUFACTURING COMPANY, OF CHICAGO, ILLINOIS.

HARVESTER.

SPECIFICATION forming part of Letters Patent No. 549,323, dated November 5, 1895.

Application filed May 4, 1894. Serial No. 510,045. (No model.)

*To all whom it may concern:*

Be it known that I, JAMES MACPHAIL, a citizen of the United States, residing at Blue Island, in the county of Cook and State of Illinois, have invented certain new and useful Improvements in Harvesters, which are fully set forth in the following specification, reference being had to the accompanying drawings, in which—

Figure 1 represents a side elevation showing a portion of the main frame and ground-wheel of a harvester embodying my invention, looking from the stubble side of the machine; Fig. 2, a plan view of the upper or outer end of the worm-shaft with spring and spring-frame applied thereto; Fig. 3, a longitudinal vertical section taken on the line 3 3 of Fig. 2; Fig. 4, a perspective view of the bracket detached, on which the outer end of the worm-shaft is mounted; Fig. 5, a similar view of the hanger in which the worm is mounted at the wheel, and Fig. 6 a plan view of the worm detached. In these drawings, Fig. 1 is upon a scale by itself. All of the remaining figures are upon one and the same scale, but considerably enlarged from that of Fig. 1.

In nearly all grain-harvesting machines of the present day there is provision made for adjusting the main frame vertically upon the axle of the main or ground wheel, for the purpose of raising and lowering the machine to regulate the height of cut according to the length of grain. My present invention relates to devices for effecting this vertical adjustment of the main frame on the axle.

It consists in certain special devices for effecting this result, the construction and operation of which will now be described in detail, in connection with such parts of the machine as may be necessary for an understanding thereof, and the special improvements which I believe to be new and desire to secure by Letters Patent will then be pointed out more definitely in claims.

In the drawings, A represents the main frame of a harvester, and B the main or ground wheel, which is mounted on an axle $b$ in the usual way. The main frame illustrated is a metal frame, and only a portion of one of the side bars $a$ is shown, this being sufficient for present purposes. The side bar shown is the outer or stubble side bar of the machine, and only the rear portion thereof is illustrated.

Well-known means for adjusting the main frame vertically on the axle are indicated in Fig. 1 of the drawings, the side bar being cut away at the axle and provided with the usual curved guides or sector-arms C and C', secured to the respective sections of the side bar, and one of them C being provided with teeth or pins $c$, and so sometimes called the "rack-bar." Both sides of the main frame are constructed alike in this respect, and the ends of the axle extend through the openings between the sector-arms, and a spur-pinion D is mounted on the axle at this point, the teeth $d$ of which are adapted to engage with the teeth on the rack-bar mentioned above. A gear-wheel E is also mounted on the axle, and the pinion D is either cast in one piece with this wheel or rigidly fastened thereto, so that the two will move together. The former construction of casting together is preferred. This gear-wheel is of the type usually known as "screw" or "worm" gear, the teeth $e$ on the rim of the wheel being slightly spiral. In order to raise and lower the main frame, this gear-wheel is rotated on the axle as usual, when of course the corresponding rotation of the pinion will raise or lower the main frame according to the direction of its movement by reason of its engagement with the rack-bar. I will now describe my improved mechanism for turning this gear-wheel on the axle. A yoke or hanger F is mounted loosely on the axle on the inside of the gear-wheel. The body of this hanger may be a plate or a skeleton frame, as seen in Figs. 1 and 5, this skeleton frame, being preferred and at one end it is provided with an aperture $f$, which is adapted to the axle, so that the hanger may be slipped upon the axle, which passes through this aperture and thereby suspended therefrom just inside of the gear-wheel, as indicated in Figs. 1 and 5. This perforated end of the hanger may therefore be called the "upper" end, and at the lower end of the device there are formed two hooks $f'$, these hooks being formed by bending upward suitable arms projecting from the lower end of the hanger, so as to make the opening of the hooks upward, as seen in Fig. 5. If the body of the hanger is skeleton, as seen in the drawings, these hooks would be formed from the extremities of the side bars, as indicated in the said figure. They may be strengthened, if desired, by flanges $f^2$ on their under sides and joined by cross-bars $f^3$, and a free open space is provided between the two hooks to accommodate a worm-gear or pinion which they are intended to carry, as will be presently described. The hooks are constructed to provide an opening in the bend of sufficient width to receive the rim of the gear-wheel on the axle, and the hanger is of such length that depending from the axle on the inside of the gear-wheel it will drop to the bottom of the said gear-wheel and the hooks pass down under the same and bend up on the outside of the said rim, as indicated in Figs. 1 and 5.

A worm G is constructed in a separate piece and adapted to be set into the hooks at the lower end of the hanger, which are shaped to provide bearings for this worm. This worm is composed of a short shaft-section or body $g$, along the central portion of which is the spiral or worm-flange $g'$. At what may be called the "outer" end of the shaft there is a collar or flange $g^2$ of about the same diameter as the spiral flange, between which and the latter the shaft is smooth and round. At the same distance from the said flange at the other end of the shaft there is a similar collar $g^3$, leaving a similar clear space on the shaft between it and the flange. These two round sections between the respective collars and the worm-flange provide suitable journals for the worm, which are adapted to be seated in the bottom of the two hooks, the latter being shaped for this purpose. The depth of the hooks and the size of the worm are relatively such that when the latter is seated in the hooks it will be directly under the gear-wheel on the axle and with the worm-flange in engagement with the said gear-wheel, as seen in Fig. 1. In this mounting and arrangement of the several parts the worm is perfectly free to be rotated in its bearings, thereby turning the gear-wheel in one direction or the other to raise or lower the main frame, as already described. It will be evident from the description that when mounted together upon the axle in this way the worm will be secured in its bearings by the gear-wheel immediately over and engaging with it, so that it cannot be displaced by any ordinary accident. It will be evident, therefore, that in order to properly mount these devices upon the axle they must first be grouped as they afterward appear on the latter—that is, the worm must be seated in the hanger and the latter then brought up by the side of the gear-wheel until the worm is brought directly underneath and into engagement with the said wheel, in which arrangement the central apertures or bearings of the wheel and hanger will coincide and the two may then be slipped upon the axle together, by which simple action all are secured in proper arrangement and adjustment as explained above.

So far as merely driving the worm is concerned the driving-shaft may be made in one piece with the worm; but evidently this construction would be an inconvenience at times because the worm is secured to the axle, as described above, and so in order to remove the driving-shaft for repairing or transportation of the machine upon cars or other carrying structure it would be necessary to remove the adjusting devices from the axle. To avoid this difficulty I make the worm in one short separate piece, as described above, and its driving-shaft proper in another piece, providing means for coupling and uncoupling these two parts at will. As shown in the drawings, this is accomplished by providing, at what has been called the "inner" end of the worm, an extension in the shape of a short lug or knob $g^4$ just beyond the inner collar $g^3$ and terminating in a loop or ring $g^5$. The shaft proper H for rotating this worm is of ordinary construction, except that it is provided at one end with an open hook $h$, which is adapted to hook into the loop just described on the inner end of the worm, thereby connecting the two, so that the rotation of the shaft will also rotate the worm. This device provides for readily connecting and disconnecting the shaft with the worm at pleasure without disturbing the worm and adjoining parts after they are mounted on the axle. The opposite or outer end of the shaft is provided with a square or angular head $h'$ for the application of a crank, as usual, by means of which the shaft is rotated whenever desired to adjust the main frame. This outer end of the shaft is also mounted, so that it may be readily detached, so that the shaft may be entirely removed from the machine whenever desired. As shown in Figs. 1, 2, and 3, this mounting is in connection with a spring, the purpose of which will be presently explained, and this device I will first describe. A bracket I is cast or otherwise constructed of metal of angular shape, adapted to fit into the rear outer corner of the main frame, as seen in Figs. 4 and 1, the bracket being secured to the respective bars of the frame by bolts or other suitable device. The web $i$ of this bracket is adapted to fit the rear crossbar of the frame, and the web $i'$ the side bar, as indicated in Fig. 1, and there are short projecting lugs $i^2$ on each web, adapted to set up to the under edge of these respective bars. Two arms $i^3$ depend from the web $i$ and terminate in open hooks $i^4$, as seen in Fig. 4. A metal frame K is provided for the reception of the worm drive-shaft and adapted to be mounted in the bracket I. This frame is of general rectangular shape, but much greater in length than width, and composed of side bars $k$ and what may be called "end"

bars $k'$ $k^2$, though these latter are enlarged and shaped in circular form to provide a kind of chamber or socket. The outer end $k$ is constructed to form a complete cup-shaped socket or recess upon its inner face, as seen in Fig. 3, having a rabbet or ledge $k^3$, a little within the edge of the cup, as seen in said figure. Both of these circular end pieces are provided with apertures or openings adapted to receive the worm driving-shaft, so that the latter may be mounted in this frame. The end piece $k'$ is also provided with an extension $k^4$ on its under side which is adapted to pass inward underneath the shaft when mounted, as seen in Figs. 1 and 2. The opposite or inner end piece $k^2$ is similar to $k'$, except that it is a plain straight-sided cup, as seen in Fig. 3, and is provided with a slot $k^5$, passing down from the upper side thereof to the center and a little beyond, and adapted to receive the worm driving-shaft, so that the latter may be let right down through this slot to its proper bearing in this end of the frame. Near its outer end this frame is provided with side trunnions $k^6$ on each side of the side bars, which trunnions are adapted to be seated in the hooks depending from the bracket I, these parts being so constructed, relatively, that the trunnions are readily set into or removed from these journal-bearings, and when mounted therein the frame is free to vibrate on these journal-supports. Just inside of the trunnions there are also side lugs $k^7$, projecting out parallel with the trunnions and leaving a space between the two adapted to accommodate the hooks $i^4$ when engaged with the trunnions, but furnishing stops to arrest the upward swinging of the frame beyond a certain point when these lugs come in contact with the depending arms $i^3$, as seen in Fig. 1. The frame K is mounted on the bracket by placing it in nearly a vertical position, when the trunnions will slip into their seats, and then upon throwing up the frame the lugs will pass up behind the bracket-hooks and thereby secure the trunnions in their seats, so that the frame cannot drop out or be detached until turned down again. There is also provided a spring J, which, as shown in the drawings, is a coil arranged within the opening in the frame and extending lengthwise thereof, surrounding the shaft when the latter is in place in the frame. The spring is held in place by the cup at the inner end, which receives this end of the spring, and by the under extension of the outer end of the frame, explained above, and as seen in Figs. 2 and 3 of the drawings. At the outer end of the frame there is a washer $j$, convex on one side to fit the cup at this end, and at the other end a plain washer $j'$, adapted to fit the straight-sided cup there located. This frame is applied to the shaft, or, in other words, the shaft is mounted therein by first placing the washers and spring upon the shaft and then arranging the latter inclined away slightly from the outer end of the frame, so that at the inner end of the latter the shaft will be outside of the end piece, as seen in dotted lines in Fig. 3. In this position the outer end of the shaft is thrust through its bearing-opening in the outer end of the frame, this latter opening being cut away to form an incline $k^8$ below the shaft, thus making a flare at this part of the bearing, which accommodates the inclination of the shaft. After passing the outer end of the shaft through this bearing a little way, the spring is compressed sufficiently to permit the shaft to drop down through the slot to its proper bearing in the inner end of the frame, and the ends of the springs, with their washers, are allowed to reach their seats prepared in the respective ends of the frame, as described above. The shaft is then mounted to the machine for work by mounting the frame in the hooks of the bracket, as already described. The outer washer $j$ is fastened to the shaft by heating the washer and then shrinking on the shaft, while the inner washer is loose thereon. Obviously, then, a sliding movement of the shaft inward in its bearings on the frame will compress the spring; but at the same time the latter will yield to permit this movement, and thus after mounting the shaft may be readily hooked into the loop on the worm and so properly connected therewith, as seen in Fig. 1. This yielding or spring device is designed to prevent accidental breakage of the gearing described above.

It will be understood that upon applying a crank to the shaft the latter may be rotated in one direction or the other, thereby rotating the worm and so turning the gear-wheel and sprocket on the axle to raise or lower the frame, so as to adjust it vertically on the axle in the usual way. Now, in actual operation in the field of a machine fitted with any gearing device for vertical adjustment, there is liability to injury in the following way: If the ground-wheel drops into a sudden depression, the shock to the machine is very great and gives such a strong tendency to a downward movement of the main frame that sometimes it is sufficient to break the gearing, which, of course, resists this downward movement. Obviously, in the construction described and shown in Figs. 1, 2, and 3, such an accidental drop will tend to turn the gear on the axle backward, which, in turn, brings a strain on the worm in a forward direction, producing a strong thrust force on the worm toward the front of the machine. If the worm-shaft is held rigidly, so far as lengthwise movement is concerned, there is, of course, no yielding of the worm under this thrust, and the force of the shock is so great that sometimes the gear-teeth break and the machine is permanently injured. Now, it will be seen from the description given above that when such a shock occurs the spring which holds the worm-shaft up into ordinary working position will yield, thus permitting a forward sliding movement of the shaft in its bearings, which, in turn, allows the hanger to swing under the influence of the thrust force mentioned above, and so gives a yielding movement to the worm and its support sufficient to avoid any breaking of the teeth, and the liability of injury mentioned above is entirely obviated. When the shock has passed, it is evident that the reaction of the spring under its increased tension will tend to return the hanger and gearing to their original normal position, and in order to secure this result the spring should be made strong enough to provide the required force for this purpose when compressed in the action described above.

When the frame is mounted as described and the shaft connected to the worm, the tension of the spring will operate to hold the frame-trunions in their bearings, and so there is no danger of accidentally detaching the frame by the shocks and shaking of the machine in actual use. This spring safety device is useful and desirable in the construction and mounting of the worm-gearing and the peculiar construction of the shaft with means for readily connecting and disconnecting therefrom.

I do not wish to be understood as limiting myself to the actual details of mechanical construction herein described and shown, as modifications in these particulars may be made without losing the main characteristics of the invention which have been set forth above.

Having thus described my invention, what I claim to be new, and desire to secure by Letters Patent, is—

1. In a harvester, the main wheel and axle, in combination with the main frame adjustable vertically thereon, pinions on the shaft adapted to engage with rack-bars or sector-arms on the main frame, a screw-gear, E, mounted on the axle and connected to one of said pinions, a yoke or hanger, F, mounted loosely on the axle, depending therefrom at one side of the said gear, and terminating in open hooks, $f'$, turned around under the gear and inclosing the rim thereof, a short worm, G, mounted in said hooks under the wheel, E, with which it engages, a frame, K, pivotally mounted in a suitable support on the main frame, a driving-shaft, H, detachably connected to the worm and mounted in said pivoted frame in which it is free to slide lengthwise, and a spring, J, mounted in said frame and connected to the shaft to normally hold it in working position, but yielding to permit the shaft to slide forward and allow the worm-support to swing in the same direction, substantially as described.

2. In a harvester, the frame, K, provided with journals by which it is mounted to a support on the main frame, in combination with the worm-shaft, H, mounted in bearings in the respective ends of said frame and free to slide therein, the spring, J, arranged in the central space of said frame and surrounding the shaft, a washer or collar, $j$, secured to the shaft and loosely seated in the outer end of the frame, a worm, G, connected to said shaft, hanger, F, loosely mounted on the axle and having bearings for the worm, and gear-wheel, E, mounted on the axle and connected with mechanism for raising and lowering the main frame, substantially as described.

3. In a harvester, the main frame, in combination with the bracket, I, secured thereto and provided with depending arms, $i^3$, terminating in open journals or hooks, $i^4$, the frame, K, provided with trunnions, $k^6$, adapted to fit said bearings, shaft, H, journaled in the respective ends of said frame and free to slide lengthwise therein, spring, J, arranged within the frame and held to the shaft at its outer end, worm, G, connected to said shaft, and swinging hanger, F, depending from the axle, in which said worm is mounted, substantially as described.

4. In a harvester, the bracket, I, secured to the main frame and provided with depending arms, $i^3$, terminating in journals, $i^4$, open at one side, in combination with the frame, K, provided with trunnions, $k^6$, fitting said bearings, and lugs, $k^7$, parallel to said trunnions and a little inside thereof, shaft, H, mounted in the respective ends of the frame and free to slide therein, spring, J, arranged in said frame and acting normally to hold the shaft out in normal working position, swinging hanger, F, mounted on the axle, and worm, G, journaled in said hanger, substantially as described.

5. In a harvester, a shaft supporting frame, K, provided at its respective ends with bearing apertures, the outer end aperture cut away to form an under incline, $k^8$, and the inner end aperture having a slot, $k^5$, extending upward through the frame, a worm driving-shaft, H, mounted in the end bearings of said frame, spring, J, arranged around the shaft and adapted to secure it in the frame, and a support on the main frame in which the said spring frame is pivotally mounted, substantially as described.

JAMES MACPHAIL.

Witnesses:
 Le Otie Leib,
 Allan A. Murray.